(12) United States Patent
Rock et al.

(10) Patent No.: US 7,500,464 B2
(45) Date of Patent: Mar. 10, 2009

(54) FUEL PROCESSOR APPARATUS AND METHOD FOR A DIESEL ENGINE

(75) Inventors: Kelly P. Rock, Henderson, NV (US); Bruce E. Nadeau, Jr., Las Vegas, NV (US)

(73) Assignee: LyteSyde, LLC, Henderson, NV (US)

( * ) Notice: Subject to any disclaimer, the term of this patent is extended or adjusted under 35 U.S.C. 154(b) by 293 days.

(21) Appl. No.: 11/368,556

(22) Filed: Mar. 6, 2006

(65) Prior Publication Data

US 2007/0204839 A1    Sep. 6, 2007

(51) Int. Cl.
*F02B 19/08* (2006.01)
(52) U.S. Cl. .................. 123/251; 123/255; 123/263; 123/275; 123/280; 123/533
(58) Field of Classification Search .......... 123/250, 123/251, 255, 263, 275, 280, 43, 528, 533, 123/590
See application file for complete search history.

(56) References Cited

U.S. PATENT DOCUMENTS

| | | | | |
|---|---|---|---|---|
| 2,223,090 A | * | 11/1940 | Boxan | 123/263 |
| 2,242,274 A | * | 5/1941 | Thysse | 123/261 |
| 2,778,347 A | * | 1/1957 | Von Mallinckrodt | 123/262 |
| 4,182,280 A | * | 1/1980 | Shekleton | 123/309 |
| 4,183,338 A | | 1/1980 | Lindberg | |
| 4,304,199 A | | 12/1981 | Formia et al. | |
| 4,332,224 A | * | 6/1982 | Latsch et al. | 123/254 |
| 4,421,079 A | * | 12/1983 | Wade | 123/255 |
| 4,879,959 A | | 11/1989 | Korenberg | |
| 5,447,130 A | | 9/1995 | Kawamura | |
| 5,542,379 A | * | 8/1996 | Kessler | 123/25 C |
| 6,116,207 A | | 9/2000 | Firey | |
| 2004/0007217 A1 | * | 1/2004 | Poola et al. | 123/533 |
| 2004/0177837 A1 | | 9/2004 | Bryant | |
| 2005/0274365 A1 | * | 12/2005 | Kahler et al. | 123/533 |

* cited by examiner

Primary Examiner—Erick Solis
(74) Attorney, Agent, or Firm—Holland & Hart

(57) ABSTRACT

The present invention provides a diesel engine and methods and apparatus for premixing diesel fuel and oxidant for combustion. The methods and apparatus may include a two stage vortex, each stage accommodating different flow rate ranges. The vortex pulverizes diesel fuel and optimally mixes the diesel fuel with an oxidant prior to introduction into a combustion chamber. The premixing results in more complete combustion and, consequently, fuel efficiency is increased and pollution is decreased.

25 Claims, 7 Drawing Sheets

FUEL PROCESSOR APPARATUS AND METHOD FOR A DIESEL ENGINE

BACKGROUND OF THE INVENTION

Rudolf Diesel developed the first diesel engine and obtained a German patent for it in 1892. His goal was to build an engine with high efficiency. Gasoline engines had been invented in 1876 and, especially at that time, were not very efficient.

Unlike gasoline engines that ignite mixtures of gas and air with a spark, a diesel engine intakes air, compresses the air, and injects fuel into the compressed air, such that the heat and pressure of the compressed air ignites the fuel spontaneously. Diesel engines do not have spark plugs or other ignition sources. Some older diesel engines include glow plugs to warm the cylinders in cold conditions, but the glow plugs are not ignition sources; rather, they are resistive warming elements.

Pistons of typical gasoline engines compress at a ratio of between 8:1 and 12:1, while a diesel engine normally compresses at a ratio of 14:1 to 25:1. The higher compression ratio of the diesel engine leads to more torque and better fuel efficiency. The use of diesel fuel allows the compression ratios of diesel engines to be much higher than for gasoline engines. Gasoline auto-ignites at lower temperatures and pressures that diesel fuel, and auto-ignition results in knock in gasoline engines.

Diesel fuel has a higher auto-ignition temperature than gasoline and is heavier and oilier than gasoline. Diesel fuel evaporates much more slowly than gasoline—its boiling point is actually higher than the boiling point of water. Diesel fuel contains more carbon atoms in longer chains than gasoline does (gasoline is typically primarily $C_9H_{20}$, while diesel fuel is typically primarily $C_{14}H_{30}$). Crude oil also requires less refining to create diesel fuel, which is why diesel fuel is generally cheaper than gasoline.

Diesel fuel also has a higher energy density than gasoline. On average, one gallon (3.8 L) of diesel fuel contains approximately $155 \times 10^6$ joules (147,000 BTU) of energy, while one gallon of gasoline contains $132 \times 10^6$ joules (125,000 BTU) of energy. This higher energy density, combined with the improved efficiency of high compression diesel engines, explains why diesel engines get better fuel economy than equivalent gasoline engines.

The fuel injector of a diesel engine is usually its most complex component and has been the subject of a great deal of experimentation—in any particular engine it may be located in a variety of places. The injector must withstand the temperature and pressure inside the cylinder and still deliver the fuel in a fine mist. Circulating the mist of fuel in the cylinder so that it is evenly distributed is also a common problem.

Even distribution of the diesel fuel within the cylinder and mixing the fuel with air contribute to the completeness of combustion of the diesel fuel. To optimize fuel oxidation within an engine's combustion chamber, the fuel/air mixture is ideally vaporized or homogenized to achieve a chemically-stoichiometric gas-phase mixture. Ideal fuel oxidation results in more complete combustion and lower pollution.

Relative to internal combustion engines, stoichiometricity is a condition where the amount of oxygen required to completely burn a given amount of fuel is supplied in a homogeneous mixture resulting in optimally correct combustion with no residues remaining from incomplete or inefficient oxidation. Ideally, the fuel should be completely vaporized, intermixed with air, and homogenized prior to entering the combustion chamber for proper oxidation. Non-vaporized fuel droplets generally do not ignite and combust completely in conventional diesel engines, which presents problems relating to fuel efficiency and pollution.

Incomplete or inefficient oxidation of diesel fuel causes exhaustion of residues from the diesel engine as pollutants, such as unburned hydrocarbons, carbon monoxide, and aldehydes, with accompanying production of oxides of nitrogen. To meet emission standards, these residues must be dealt with, typically requiring further treatment in a catalytic converter or a scrubber. Such treatment of these residues results in additional fuel costs to operate the catalytic converter or scrubber. Accordingly, any reduction in residues resulting from incomplete combustion would be economically and environmentally beneficial.

Aside from the problems discussed above, a fuel-air mixture that is not completely vaporized and chemically stoichiometric causes the combustion engine to perform at less than peak efficiency. A smaller portion of the fuel's chemical energy is converted to mechanical energy when fuel is not completely combusted. Fuel energy is wasted and unnecessary pollution is created. Thus, by further breaking down and more completely vaporizing the fuel-air mixture, higher compression ratios and better fuel efficiency may be available.

Many attempts have been made to alleviate the above-described problems with respect to fuel vaporization and incomplete fuel combustion. Diesel fuel injectors spray a somewhat fine fuel mist directly into the cylinder of the engine and are controlled electronically. Nevertheless, the fuel droplet size of a fuel injector spray is not optimal and there is little time for the fuel to mix with air prior to ignition. Even current fuel injector systems do not fully mix the fuel with the necessary air.

Moreover, it has been recently discovered that fuel injector sprays are accompanied by a shockwave in the fuel spray. The shockwave may prevent the fuel from fully mixing with air. The shockwave appears to limit fuel mass to certain areas of the piston, limiting the fuel droplets' access to air.

SUMMARY

The principles described herein may address some of the above-described deficiencies and others. Specifically, some of the principles described herein relate to liquid processor apparatuses and methods.

One aspect provides a method comprising fueling a diesel engine. The fueling comprises creating a gaseous, homogenous premixture of diesel fuel and oxidizer in a first pre-combustion vortex chamber and introducing the gaseous, homogenous premixture of diesel fuel and oxidizer from the first pre-combustion vortex chamber into a combustion chamber. According to one aspect, the method further comprises minimizing or preventing shockwaves in the combustion chamber. One aspect comprises igniting the gaseous, homogenous premixture of diesel fuel and oxidizer with an ignition source.

According to one aspect of the method, creating a gaseous, homogenous premixture of diesel fuel and oxidizer comprises creating an oxidizer vortex in the first pre-combustion vortex chamber, introducing diesel fuel at an axis of the oxidizer vortex, and pulverizing the diesel fuel and mixing the diesel fuel with the oxidizer at an axial area of the first pre-combustion vortex chamber. According to one aspect, creating a gaseous, homogenous premixture of diesel fuel and oxidizer comprises creating an oxidizer vortex in the first pre-combustion vortex chamber, introducing diesel fuel at an axis of the oxidizer vortex, pulverizing the diesel fuel and mixing the diesel fuel with the oxidizer, wherein the creating an oxidizer vortex comprises introducing the oxidizer into the first pre-combustion vortex chamber at a non-tangential, non-radial angle through multiple fluid passageways.

According to one aspect of the method, creating a gaseous, homogenous premixture of diesel fuel and oxidizer comprises providing a primary stage oxidizer introduction path, providing a secondary stage oxidizer introduction path, opening a valve in the secondary stage oxidizer introduction path upon reaching a predetermined oxidizer requirement threshold, creating an oxidizer vortex in a second pre-combustion vortex chamber with fluid flow from the secondary stage oxidizer introduction path, introducing diesel fuel at an axis of the oxidizer vortex, pulverizing the diesel fuel and mixing the diesel fuel with the oxidizer. According to one aspect, the valve in the primary stage oxidizer introduction path remains open with the opening of the valve in the secondary stage oxidizer introduction path.

One embodiment comprises an a diesel engine. The diesel engine comprises a block, one or more combustion chambers or cylinders disposed in the block, a reciprocating member disposed in each of the one or more combustion chambers, and a pre-combustion diesel fuel mixing device fluidly connected to the one or more combustion chambers. According to one embodiment, the pre-combustion diesel fuel mixing device comprises a housing, a first pre-combustion vortex chamber enclosed by the housing, a plurality of angled passages leading into the first pre-combustion vortex chamber for creating a vortex, and a first oxidant fluid flow path in fluid communication with the first pre-combustion vortex chamber. One embodiment further comprises an ignition device extending into each of the one or more combustion chambers. The ignition device may comprise a spark plug.

According to one embodiment of the diesel engine, the pre-combustion diesel fuel mixing device comprises a second pre-combustion vortex chamber enclosed by the housing and aligned axially with the first pre-combustion vortex chamber, the second pre-combustion vortex chamber being larger than the first pre-combustion vortex chamber, a plurality of angled passages leading into the second pre-combustion vortex chamber for creating a vortex, and a second oxidant fluid flow path in fluid communication with the second pre-combustion vortex chamber. According to one embodiment, the angled passageways are non-tangential and non-radial.

One embodiment of the diesel engine further comprises a first diverging nozzle leading out of the first pre-combustion vortex chamber, the first diverging nozzle comprising a plurality of lateral passages angled opposite of the plurality of angled passages leading into the first pre-combustion vortex chamber. According to one embodiment, the diesel engine further comprises a conical pillar adjacent to an outlet of the pre-combustion diesel fuel mixing device.

According to one embodiment of the diesel engine, the pre-combustion diesel fuel mixing device comprises a second pre-combustion vortex chamber enclosed by the housing and aligned axially with the first pre-combustion vortex chamber. The second pre-combustion vortex chamber may be larger than the first pre-combustion vortex chamber. According to one embodiment, a plurality of angled passages lead into the second pre-combustion vortex chamber for creating a vortex. In one embodiment, the diesel engine may also comprise a second oxidant fluid flow path in fluid communication with the second pre-combustion vortex chamber and a throttle body housing a valve. In one embodiment, the valve controls fluid flow through the second oxidant fluid flow path.

One embodiment of the diesel engine further comprises a fuel injector aligned substantially axially with the first and second pre-combustion vortex chambers. The fuel injector comprises an axial flow channel, and a plurality of radial flow channels.

One embodiment of the diesel engine further comprises a turbocharger. In one embodiment, the pre-combustion diesel fuel mixing device is fluidly connected between the turbocharger and the one or more combustion chambers. According to one embodiment, the pre-combustion diesel fuel mixing device further comprises a fuel injector disposed in a cylindrical cavity of the housing and in fluid communication with the first and second pre-combustion vortex chambers, the fuel injector comprising a liquid flow channel and a vent in fluid communication between the liquid flow channel and an oxidant flow introduction path.

One aspect provides a method comprising operating a diesel engine. Operating the diesel engine comprises creating a gaseous, homogenous premixture of diesel fuel and oxidizer in a first pre-combustion vortex chamber, flowing the gaseous, homogenous premixture of diesel fuel and oxidizer into a cylinder of the diesel engine, compressing the gaseous, homogenous premixture of diesel fuel and oxidizer in the cylinder with a piston at a ratio of at least about 15:1 without causing auto-ignition of the gaseous, homogenous premixture of diesel fuel and oxidizer, and igniting the gaseous, homogenous premixture of diesel fuel and oxidizer. According to one aspect, igniting comprises creating a spark with a spark plug in the cylinder. In one aspect, the method further comprises compressing the gaseous, homogenous premixture of diesel fuel and oxidizer in the cylinder with a piston at a ratio greater than 21:1 without causing auto-ignition of the gaseous, homogenous premixture of diesel fuel and oxidizer. According to one aspect, creating a gaseous, homogenous premixture of diesel fuel and oxidizer comprises maintaining a combustible mixture while reducing the diesel fuel to an average particle size such that compressing the gaseous, homogenous premixture of diesel fuel and oxidizer in the cylinder with a piston at a ratio of at least 25:1 does not cause auto-ignition of the gaseous, homogenous premixture of diesel fuel and oxidizer. According to one aspect, the method further comprises compressing the gaseous, homogenous premixture of diesel fuel and oxidizer in the cylinder with a piston at a ratio of at least 30:1 or 40:1 without causing auto-ignition of the gaseous, homogenous premixture of diesel fuel and oxidizer One embodiment provides an apparatus comprising a diesel engine fuel premixing device. The device comprises a two stage vortex chamber. A first stage is in fluid communication with a first oxidation flow path, and a second stage is in fluid communication with a separate, second oxidation flow path. The device includes a fuel injector arranged circumferentially internal of the first and second stages and a diesel engine fluidly connected to the diesel engine premixing device. In one embodiment, the diesel engine comprises spark plugs. According to one embodiment, the first stage, the second stage, and the fuel injector are substantially coaxial. According to one embodiment, the first stage comprises a high vacuum, low flow rate vortex chamber, and the second stage comprises a larger volume than the first stage and comprises a low vacuum, high flow rate vortex chamber. In one embodiment, the first and second stages comprise low and high flow rate vortex chambers, respectively, that may be subject to positive pressures as well as vacuum pressures.

One embodiment of the apparatus further comprises a first nozzle disposed at an outlet to the first stage. The first nozzle may comprise fluid passages arranged both in a vortex direction and a direction opposite of the vortex direction. The opposite arrangement of the fluid passages in the first nozzle may direct fluids pulverized by the first stage axially in a generally non-rotational flow. One embodiment of the apparatus further comprises a diverging nozzle at an outlet of the second stage.

One embodiment comprises a pillar arranged adjacent to the diesel engine premixing device for centering a vortex created in the first or second stages. In one embodiment, the fuel injector comprises axial and radial ports for injecting fuel into the first and second stages. According to one embodiment, the device is infinitely adjustable between oxidant fluid flow directed to the first and second stages. According to one embodiment, only the first oxidation source is open to the first stage until a predetermined flow rate is reached, and the second oxidation source is also opened when the predetermined flow rate is reached. One embodiment further comprises a water jacket disposed about the first stage of the two stage vortex chamber.

One aspect provides a method comprising fueling a diesel automobile. The method comprises premixing diesel fuel with an oxidant. The premixing comprises introducing diesel fuel into an oxidant vortex to create a premixed diesel fuel and oxidant mixture, and introducing the premixed diesel fuel and oxidant mixture into a combustion chamber of the automobile without forcing additional diesel fuel into the combustion chamber. According to one aspect, the premixing comprises providing first and second vortex chambers in series, such that the first vortex chamber only or both the first and second vortex chambers receive a supply of oxidant. The oxidant may enter the first or second vortex chamber at an angle and create the oxidant vortex. According to one aspect, the method includes providing a fuel injector and injecting fuel axially. Injecting may comprise injecting diesel fuel axially into the oxidant vortex created by either one of the first or second vortex chambers. According to one aspect, the premixing comprises centering and holding the oxidant vortex. According to one aspect, the drawing comprises evenly distributing the premixed diesel fuel and oxidant into a manifold.

BRIEF DESCRIPTION OF THE DRAWINGS

The accompanying drawings illustrate certain embodiments discussed below and are a part of the specification.

Throughout the drawings, identical reference characters and descriptions indicate similar, but not necessarily identical elements.

DETAILED DESCRIPTION

Illustrative embodiments and aspects are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

As used throughout the specification and claims, the term "pre-combustion chamber" refers to an area that is not a combustion area. The words "including" and "having," as used in the specification, including the claims, have the same meaning as the word "comprising."

Figure 1:
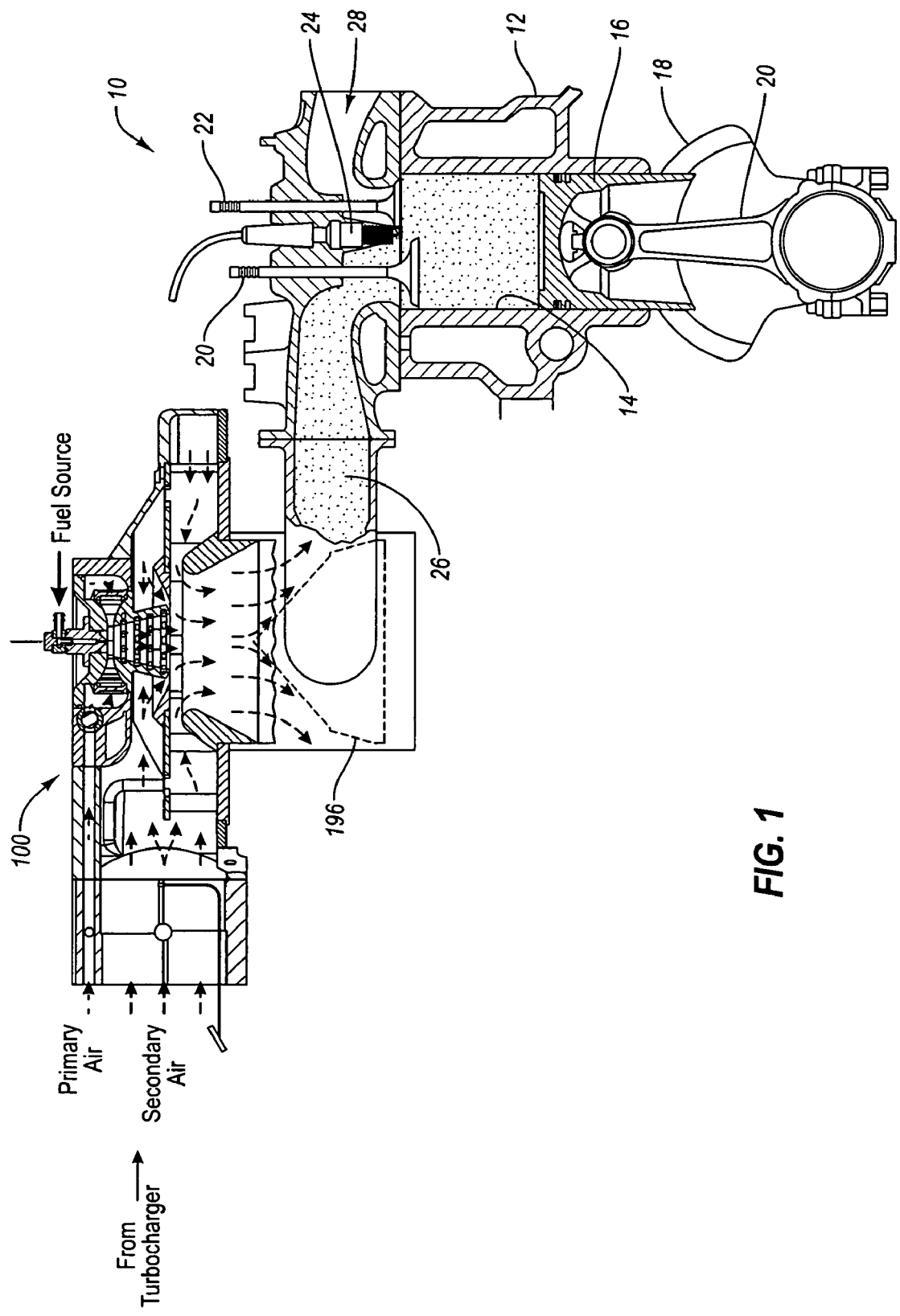
FIG. 1 is a cross sectional view of a diesel engine with a fuel mixing apparatus according to one embodiment.
Figure 2:
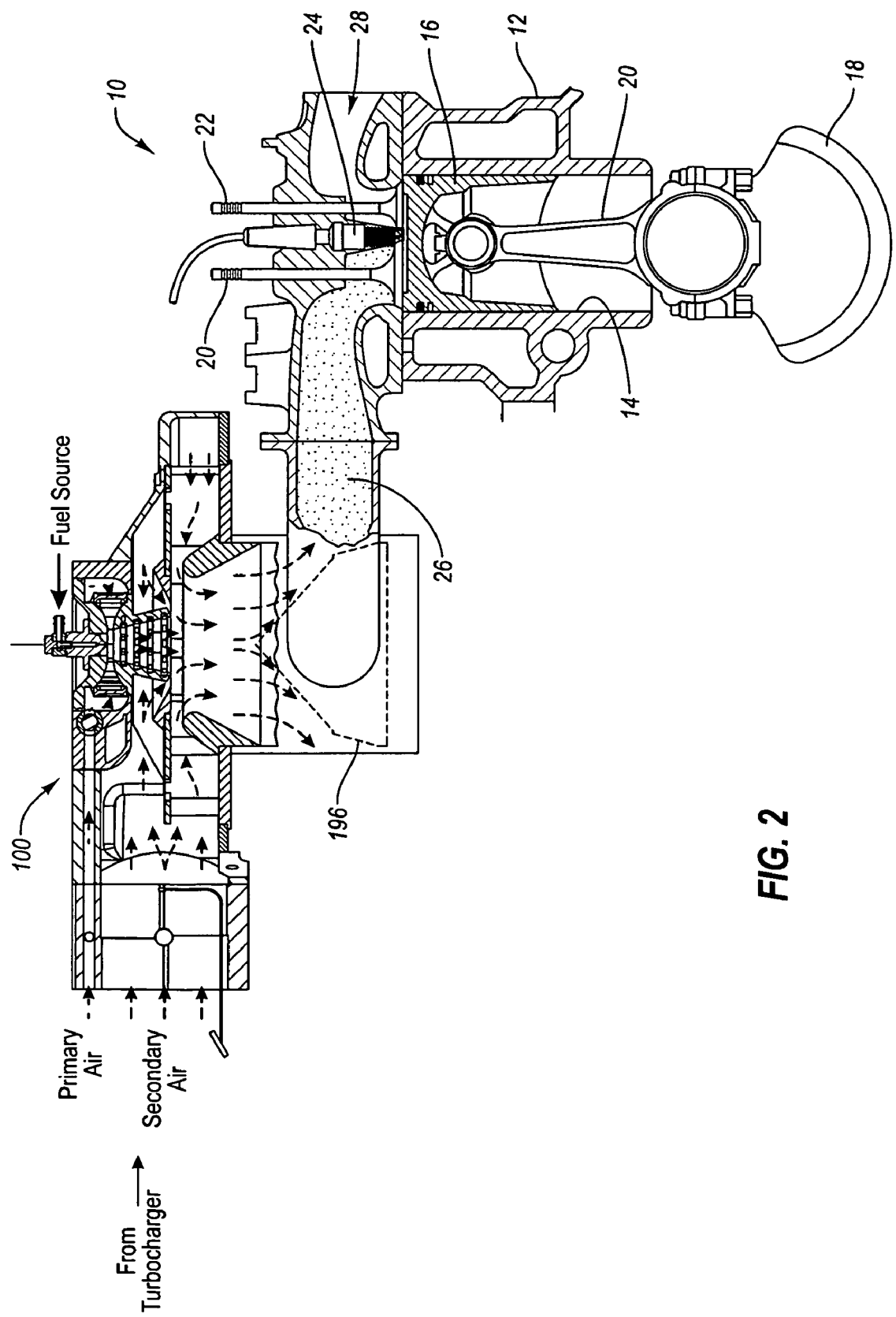
FIG. 2 is a cross sectional view of the diesel engine and fuel mixing apparatus shown in FIG. 1, with a piston compressing an air/fuel mixture according to one embodiment.

Turning now to the figures, and in particular to FIGS. 1-2, one embodiment of a diesel engine 10 is shown. As known to those of ordinary skill in the art having the benefit of this disclosure, the diesel engine 10 may include a number of standard components. For example, the diesel engine 10 of FIGS. 1-2, includes a block 12. At least one bore in the block 12 may comprise one or more combustion chambers, for example one or more cylinders 14. A reciprocating member, such as a piston 16, is disposed in each of the one or more cylinders 14. The piston 16 is connected to a crank shaft 18 by a tie rod 20. One or more valves 20, 22 open and close at certain times during a diesel cycle to introduce air and fuel, and exhaust combusted products. Fresh air and fuel may enter the cylinder 14 through a first passageway 26 via the first valve 20, and exhaust may exit the cylinder 14 through the second valve 22 leading to an exhaust passageway 28. The diesel engine may operate generally according to well known principles, described in part above, to produce work from diesel fuel by combusting the diesel fuel in the cylinders 14. However, although standard diesel engines do not include spark plugs, according to one embodiment, an ignition source such as a spark plug 24 may extend into or be associated with, each cylinder 14. Some of the reasons for including the spark plug 24 or another ignition source are discussed below. Other known components may also comprise parts of the diesel engine 10.

FIG. 1 illustrates an intake stroke of the diesel engine 10. The first valve 20 is open to the first passageway 26. As the piston 16 retracts, a premixture of diesel fuel and air is drawn into the cylinder 14. FIG. 2 illustrates a compression stroke of the diesel engine 10. The valves 20, 22 close, and the piston 16 compresses the air and fuel mixture in the cylinder 14. In a normal diesel engine, the piston 16 compresses only air in the cylinder 14, and pressurized diesel fuel is directly injected by a fuel injector into the cylinder. In addition, the compression tends to generate sufficient heat and pressure to auto-ignite standard mixtures of diesel fuel and air in the cylinder. However, according to one embodiment discussed herein, diesel fuel is not fuel injected, instead the diesel fuel and oxidant are premixed before entering the cylinder 14 or other combustion chamber. Moreover, according to some embodiments, it is expected that compression ratios of up to about 15:1, over about 21:1, up to 25:1, and even up to 40:1 or more do not cause the premixed diesel fuel and oxidant to auto-ignite.

Therefore, according to one embodiment, the spark plug 24 or other ignition source is associated with the cylinder 14 to initiate combustion.

Figure 3:
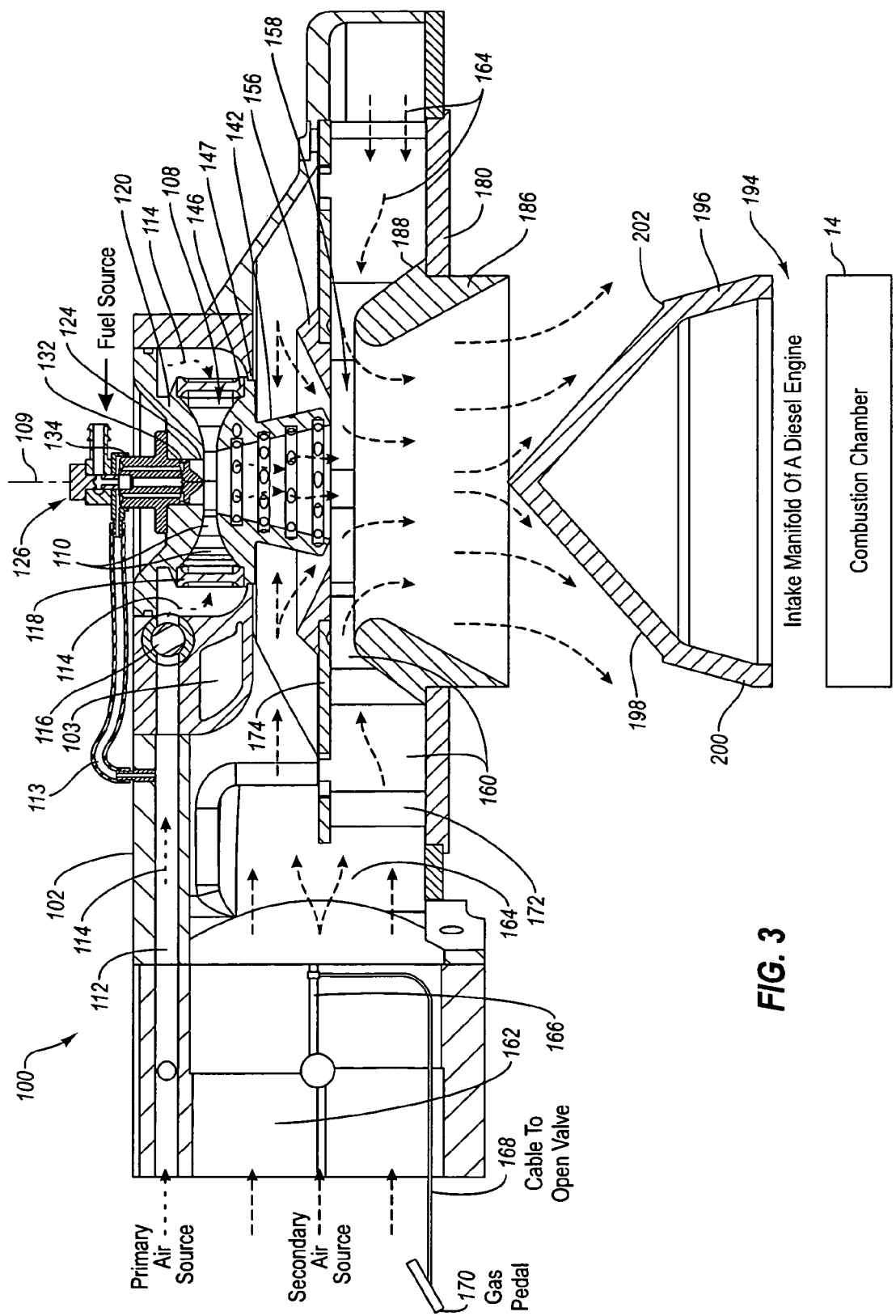
FIG. 3 is a magnified cross sectional view of the mixing apparatus in relation to an intake manifold of the diesel engine according to one embodiment.

One reason engine compression ratios as high as 40:1 or more may not cause auto-ignition is the very fine, homogenous mixture of diesel fuel and oxidant supplied to the engine 10. According to one embodiment, the diesel engine 10 includes and is fueled by a mixing apparatus that may reduce the particle size of a majority of the diesel fuel to 50 μm or smaller. According to one embodiment, the mixing apparatus may reduce the particle size of a majority of the diesel fuel to 20 μm or smaller, for example the mixing apparatus may pulverize at least 80-95% of the diesel fuel to a particle size of approximately 1-3 μm or smaller. The mixing apparatus may comprise, for example, a pre-combustion diesel fuel mixing device 100. The pre-combustion diesel fuel mixing device 100 may provide a premixed supply of diesel fuel and oxidant to an internal combustion engine or other device. FIGS. 1-3 illustrate the pre-combustion diesel fuel mixing device 100 fully assembled and in cross-section. FIG. 3 is a magnified illustration of the pre-combustion diesel fuel mixing device 100 and is primarily referenced below for clarity in identifying elements described.

Figure 7:
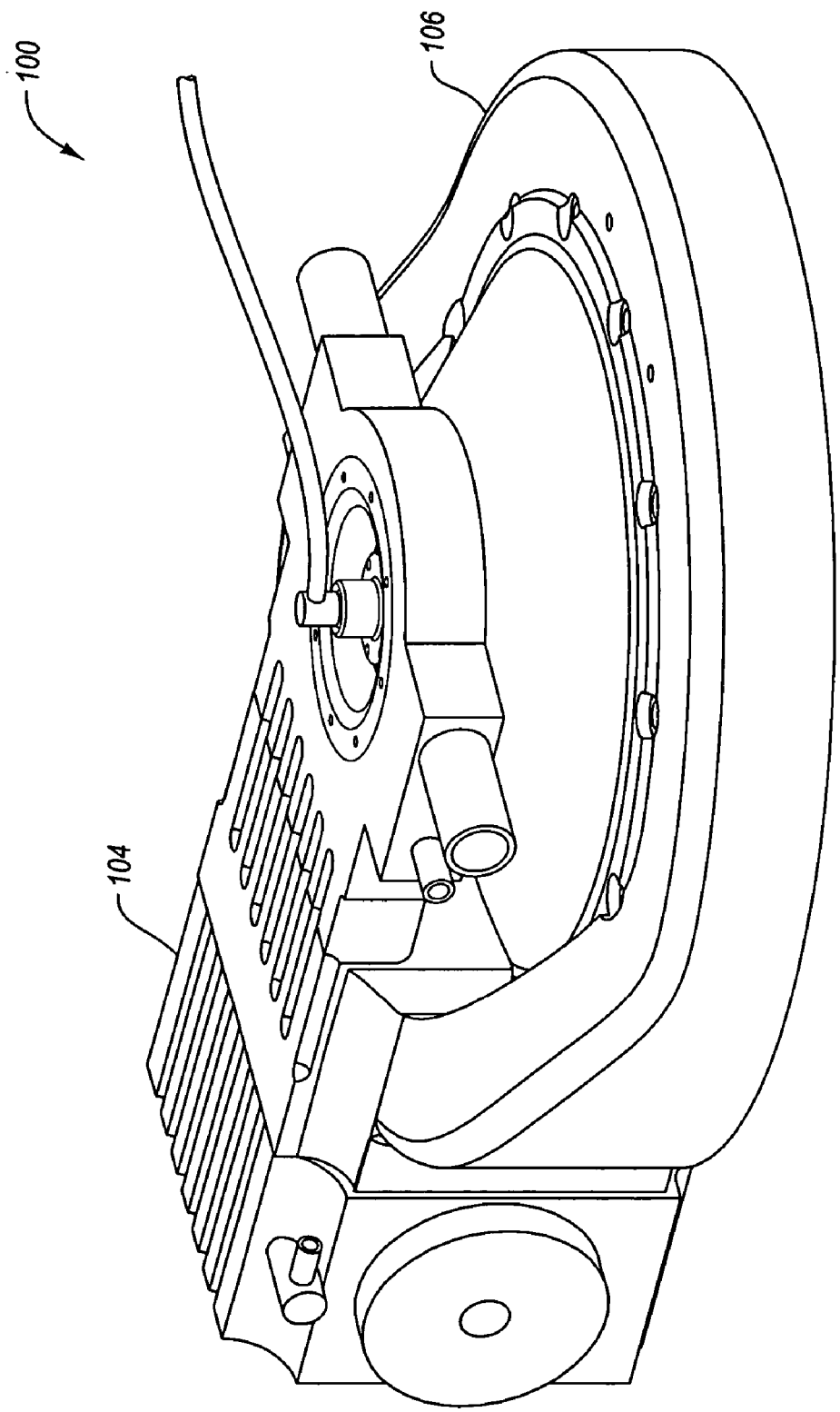
FIG. 7 is a perspective view of the mixing apparatus of FIG. 3.

As shown in FIG. 3, according to one embodiment, the pre-combustion diesel fuel mixing device 100 comprises a housing 102. The housing 102 is a generally rigid structure that may be made of metal, ceramic, composite, plastic, or other materials. The housing 102 encloses a number of internal components which are described below. The housing 102 is shown in perspective view in FIG. 7. The housing 102 may comprise any size or shape, although as shown in FIG. 7, some embodiments of the housing 102 include an oxidant inlet section 104 and a vortex section 106. The oxidant inlet section 104 may comprise a throttle body as shown in FIG. 7.

Returning to FIG. 3, the housing 102 encloses a first pre-combustion vortex chamber or first stage 108. The first pre-combustion vortex chamber 108 comprises a first axis 109. A plurality of angled passages 110 lead into the first pre-combustion vortex chamber 108. The plurality of angled passages 110 facilitate the creation of a vortex or tornado in the first pre-combustion vortex chamber 108. A first oxidant flow introduction path 112 disposed in the housing 102 is in fluid communication with the first pre-combustion vortex chamber 108. The first oxidant flow introduction path 112 provides a primary air or oxidant source to the first pre-combustion vortex chamber 108. A set of arrows 114 indicates the direction of the flow of air or other oxidant through the first oxidant flow introduction path 112 into the first pre-combustion vortex chamber 108. A first valve 116 disposed in the first oxidant flow path 112 may comprise an electronically controlled valve to regulate the flow or flow rate of air into the first pre-combustion vortex chamber 108 based on need.

The plurality of angled passages 110 leading into the first pre-combustion vortex chamber 108 may comprise slots formed in and spaced around a periphery of a wheel such as first vortex wheel 118. The first vortex wheel 118 is most clearly shown in the perspective view of FIG. 4. The first vortex wheel 118 may comprise a generally rigid structure and may be made of metal, plastic, ceramic, composite, or other materials. The first vortex wheel 118 is coaxial with first axis 109. The angled passages 110 of the first vortex wheel 118 may be non-tangential, and non-radial. That is to say, the angled passages 110 comprise an angle from tangent greater than zero degrees and less than ninety degrees (ninety degrees is perfectly radial or centered). The angled passages 110 may be angled between about ten and seventy degrees. The angled passages 110 may range between about five and fifty degrees.

The angled passages 110 may be at least about thirty degrees from tangent. Thus, the angled passages 110 tend to facilitate creation of a vortex in the first pre-combustion vortex chamber 108 as air is introduced therein. The vortex tends to be spaced internal of the first wheel 118, as the angled passages 110 are non-tangential.

Figure 4:
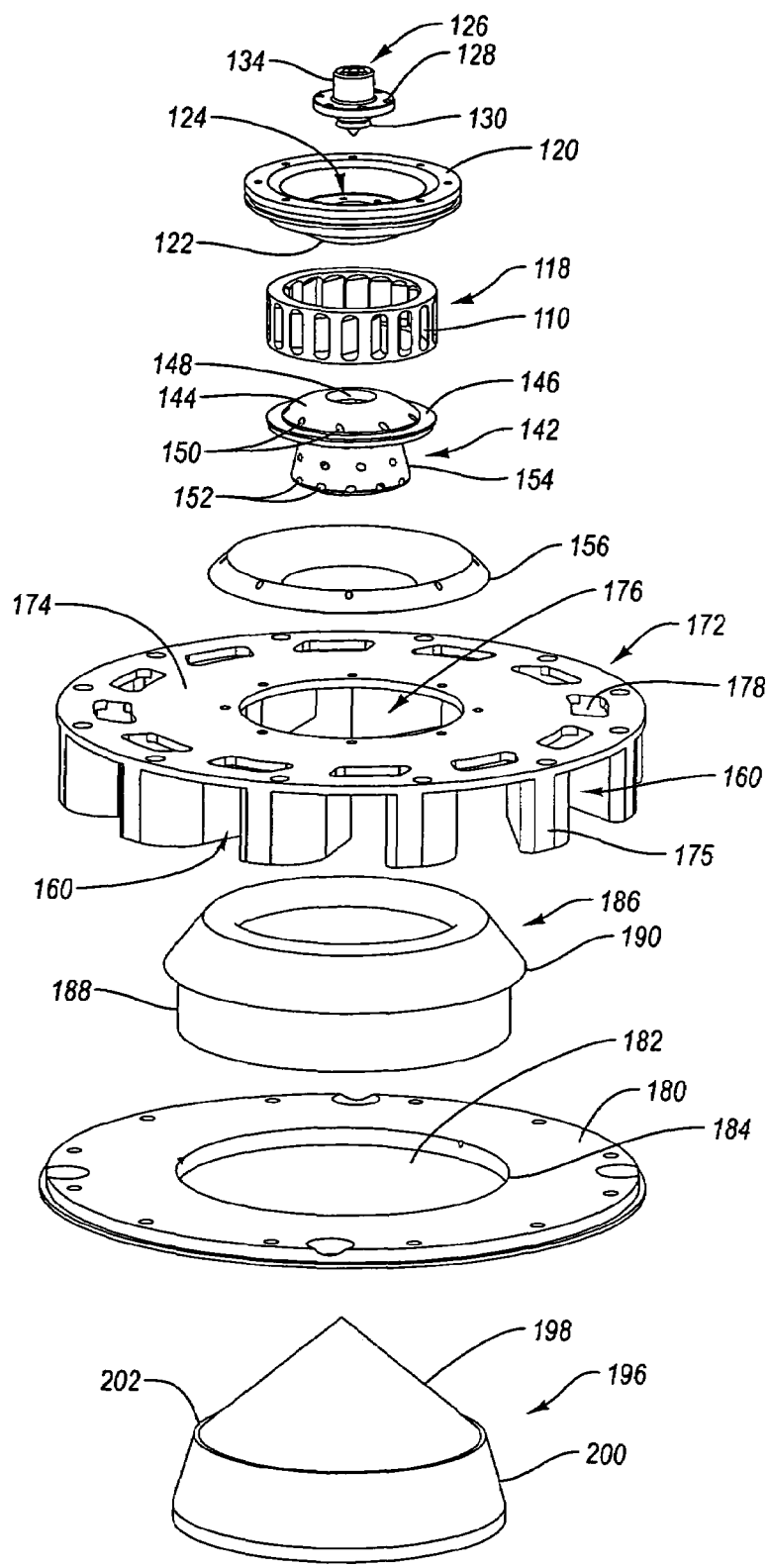
FIG. 4 is a perspective assembly view of a set of vortex creating components shown in FIG. 3, prior to enclosure within a housing.
Figure 5:
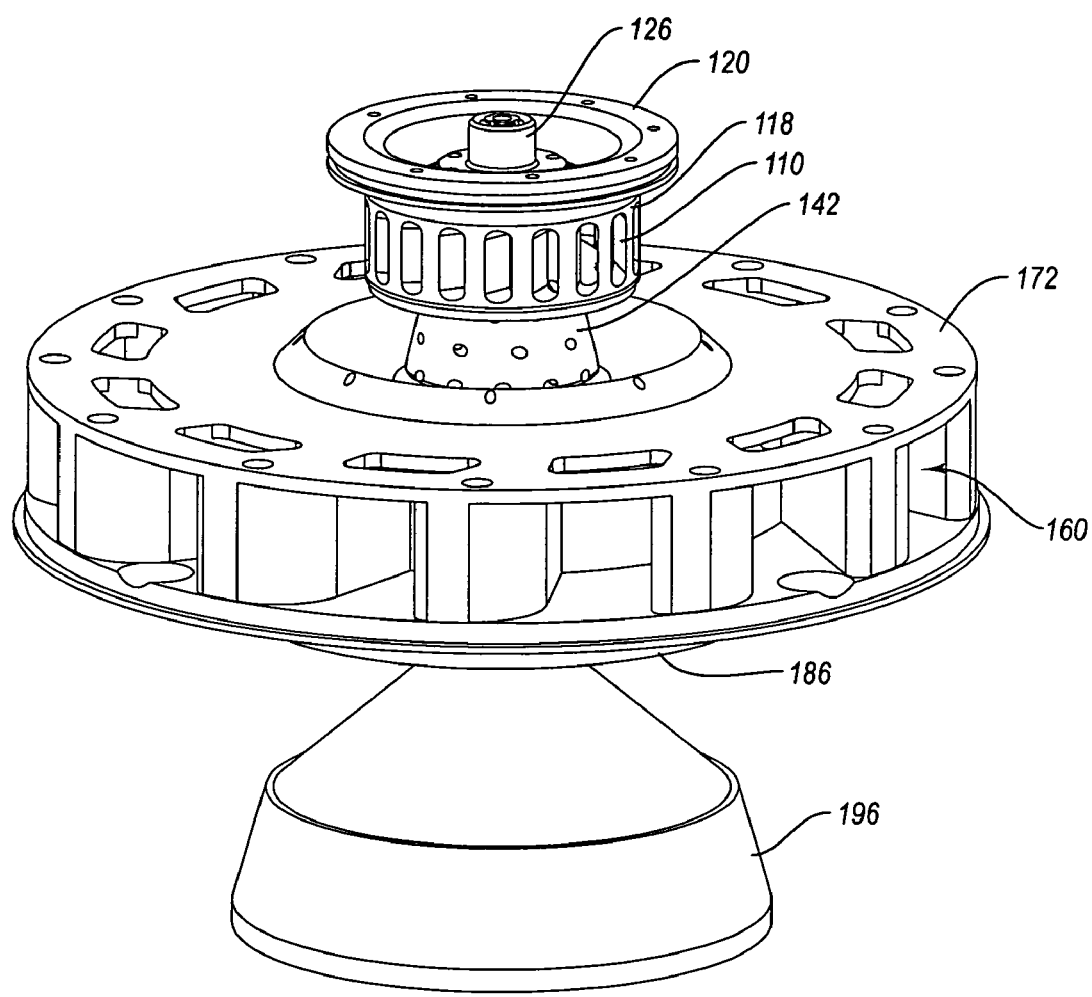
FIG. 5 is a perspective view of the components shown in FIG. 4 following assembly.

According to one embodiment, the first vortex wheel 118 is adjacent to and in contact with a hat 120. The hat 120 is generally circular and attached to the housing 102. The hat 120 may be semi-spherical or dish shaped and extend partially into the center of the first vortex wheel 118. For example, a spherical portion 122 of the hat 120 may extend approximately half way into the center of the first vortex wheel 118. The hat 120 may comprise metal, plastic, ceramic, composite, or other material. As best shown in FIG. 3-5, the hat 120 may be coaxial with the first vortex wheel 118. The hat 120 also includes a central hole 124 that may define a cylindrical cavity. The central hole 124 of the hat 120 is receptive of an injector, such as fuel injector 126.

According to one embodiment, the fuel injector 126 may be coaxial with the first wheel and the hat 120. The fuel injector 126 may include a flange 128 that connects the fuel injector 126 to the hat 120 and creates a seal. However, a head 130 of the fuel injector 126 inserts into the central hole 124 of the hat 120. The diameter of the central hole 124 and the diameter of the head 130 of the fuel injector 126 are sized to leave an annulus 132 between an inner surface of the central hole 124 and an outer surface of the head 130. The fuel injector 126 also includes a tail 134 that may extend outside of the housing 102. The fuel injector 126 is in fluid communication with a fuel source.

According to one embodiment, the fuel injector 126 may include an inlet 135 and multiple fluid or liquid ports. For example, according to the embodiment of FIGS. 6A-6B, the fuel injector 126 includes an axial flow channel 136 and a plurality of radial flow channels 138, each in fluid communication with the inlet 135. According to the embodiment of FIGS. 6A-6B, there are four equally spaced radial flow channels 138. In addition, the fuel injector 126 may include one or more pressure equalization vents, such as vents 140. The vents 140 may fluidly communicate with the first oxidant flow introduction path 112 via a conduit 113 (FIG. 3), and there may be one vent 140 in fluid communication with each of the radial flow channels 138. Therefore, according to FIGS. 6A-6B, there are four vents 140. The atmospheric vents 140 prevent a pressure differential at the radial flow channels 138 and thus the axial flow channel 136. The vents 140 equalize pressure at the flow channels 136, 138 even in positive pressure situations (due, for example, to turbocharging).

Figure 6B:
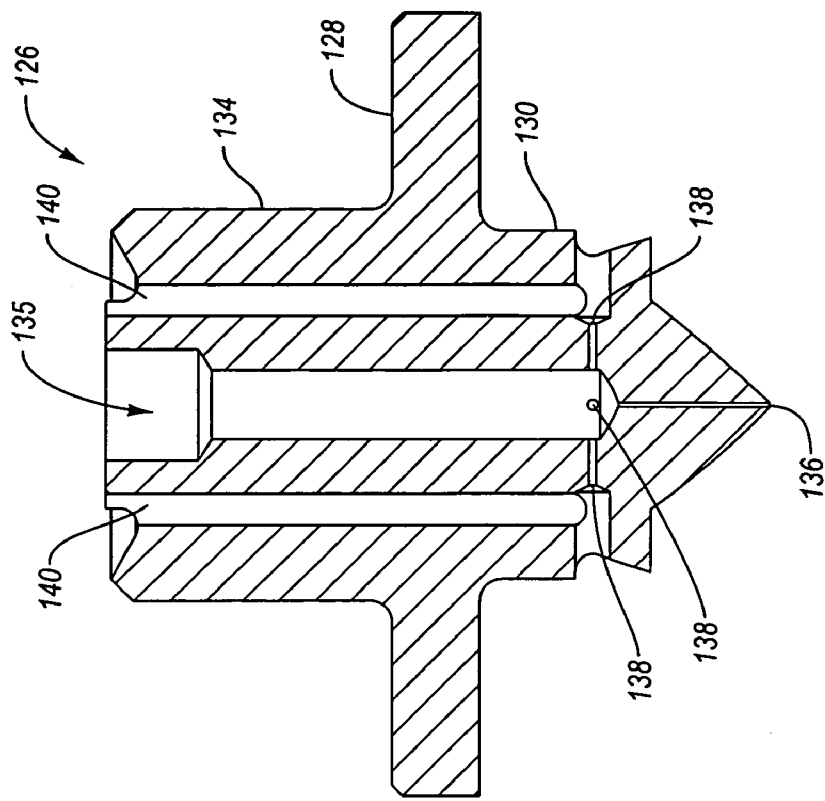
FIG. 6B is a cross sectional view of the injection nozzle shown in FIG. 6A.
Figure 6A:
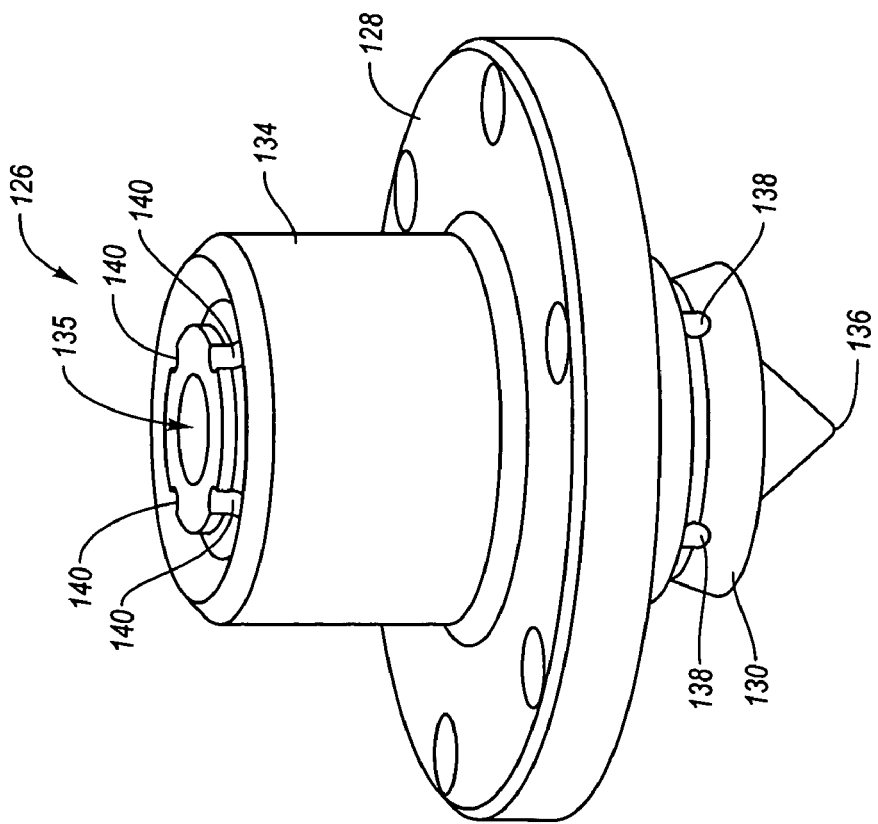
FIG. 6A is a perspective view of an injection nozzle used in the mixing apparatus according to one embodiment.

Returning to FIGS. 3-4, according to one embodiment, the annulus 132 may provide a gap large enough to eliminate any flow restriction of fluids exiting the head 130 radially through the radial flow channels 138 (FIG. 6B). That is to say, the size or diameter of the radial flow channels 138 tends to limit flow capacity rather than the annulus 132. The fuel injector 126 is arranged radially inside a circumference of the first pre-combustion vortex chamber 108 and introduces fuel to the first pre-combustion vortex chamber 108 at the axis 109, rather than laterally through the angled passages 110.

According to the embodiment of FIGS. 1-7, the first vortex wheel 118 is arranged adjacent to and may contact a first output nozzle 142. The first output nozzle 142 is arranged coaxially with the first vortex wheel 118 and may comprise a diverging nozzle made of metal, plastic, ceramic, composite, or other material. The first output nozzle 142 may include a hemispherical hat 144 that extends partially into the first vortex wheel 118. A lip 146 around the hemispherical hat 144 may provide a contact or resting surface for the first vortex wheel 118. The lip 146 may sit on an internal protrusion 147 of the housing 102. Accordingly, the first output nozzle 142 may be suspended within the housing 102 as shown in FIG. 3.

According to one embodiment, the first output nozzle 142 comprises a central hole 148 that is open to the first pre-combustion vortex chamber 108. In addition, the first output nozzle 142 includes a plurality of small angled passages extending laterally therethough at different angles. For example, according to the embodiment of FIG. 4, the first output nozzle 142 includes a first set of angled passages 150 in the hemispherical hat 144 and a second set of angled passages 150, 152 in a conical tail portion 154. The first and second sets of angled passages 150, 152 may include passages directing fluid in both clockwise and counter-clockwise directions. There may be any number of passages in the clockwise and counter-clockwise directions, and there may be a substantially equal number in each direction to create a non-vertical or non-rotational flow through the first output nozzle 142.

According to one embodiment, the first output nozzle 142 leads to a second pre-combustion vortex chamber or second stage 158. Together with the first pre-combustion vortex chamber 108, the second pre-combustion vortex chamber forms a two stage vortex chamber. The second pre-combustion vortex chamber 158 may be coaxial with the first axis 109. The second pre-combustion vortex chamber 158 is larger than the first pre-combustion vortex chamber 108 and may comprise a radius at least twice as large as the radius of the first pre-combustion vortex chamber 108. A second plurality of angled passages 160 lead into the second pre-combustion vortex chamber 158. The second plurality of angled passages 160 facilitate the creation of a vortex or tornado in the second pre-combustion vortex chamber 158. A second or secondary oxidant flow introduction path 162 disposed in the housing 102 is in fluid communication with the second pre-combustion vortex chamber 158. The secondary oxidant flow introduction path 162 is larger than the first oxidant flow introduction path 112. The secondary oxidant flow path 162 provides air or another oxidant source to the second pre-combustion vortex chamber 158. Arrows 164 indicate the direction of the flow of air or other oxidant into the second pre-combustion vortex chamber 158 and through the second set of angled passages 152 in the conical tail portion 154 of the first output nozzle 142. A valve such as a second or butterfly valve 166 disposed in the second oxidant flow path 162 may comprise an electronically or mechanically controlled valve to regulate the flow rate of air into the second pre-combustion vortex chamber 158 based on need. The larger secondary oxidant flow path 162 and second pre-combustion vortex chamber 158 accommodate high fluid flow rates as needed. If mechanically controlled, the butterfly valve 166 may be connected by a cable 168 to a pedal or throttle such as a gas pedal 170 of an automobile.

According to one embodiment, the plurality of angled passages 160 leading into the second pre-combustion vortex chamber 158 may comprise slots formed in and spaced around a periphery of another wheel such as second vortex wheel 172. The second vortex wheel 172 is most clearly shown in perspective view in FIG. 4. The second vortex wheel 172 may be larger—and according to some embodiments at least twice as large—as the first vortex wheel 118. The second vortex wheel 172 may comprise a generally rigid structure and may be made of metal, plastic, ceramic, composite, or other materials. The second vortex wheel 172 is coaxial with the first axis 109. The angled passages 160 of the second vortex wheel 172 may be non-tangential, and non-radial. The angled passages 160 comprise an angle from tangent greater than zero degrees and less than ninety degrees. The angled passages 160 may be angled between about ten and seventy degrees. The angled passages 160 may range between about five and fifty degrees. The angled passages 160 may be at least about thirty degrees from tangent. Thus, the angled passages 160 tend to facilitate creation of a vortex in the second pre-combustion vortex chamber 158 as air is introduced therein. The vortex tends to be spaced internal of the second wheel 172, as the angled passages 160 are non-tangential. The second vortex wheel 172 may include a lid 174 with a central hole 176 open to the first output nozzle 142, and a plurality of smaller holes 178. A restrictor plate 156 may be disposed in the central hole 176. The restrictor plate 156 may be curved or funneled as shown in the embodiment of FIG. 4. The angled passages 160 may be formed between cantilevered protrusions 175 extending from the lid 174.

According to one embodiment, the second vortex wheel 172 may rest on and may be attached to a closing plate 180. The closing plate 180 may be substantially flush with the housing 102 and includes a central hole 182 coaxial with the first axis 109. An inner ring 184 of the closing plate 180 may support a second or final outlet nozzle 186. The second outlet nozzle 186 and the closing plate 180 may comprise generally rigid structures and may be made of metal, plastic, ceramic, composite, or other materials. The second outlet nozzle 186 may comprise an interior diverging nozzle as best shown in FIG. 3. The second outlet nozzle 186 may include a generally cylindrical outer portion 188 and an outer lip 190 having a diameter greater than the generally cylindrical portion 188. The generally cylindrical outer portion 188 is sized to slide into the central hole 182 of the closing plate 180, but the outer lip 190 limits the insertion depth. The outer lip 190 comprises a diameter that is larger than the diameter of the central hole 182. According to one embodiment, the second outlet nozzle 186 straddles the closing plate 180 and extends partially into the interior of the second vortex wheel 172. According to one embodiment, the first and second vortex chambers and one or more of the other components described above may comprise an axially aligned vortex assembly.

According to one embodiment, the second outlet nozzle 186 leads out of the pre-combustion fuel mixing device 100 and may provide a premixture of gaseous, homogenous diesel fuel and oxidizer to a combustion chamber such as cylinder 14. According to one embodiment, the pre-combustion diesel fuel mixing device 100 is arranged adjacent to an intake manifold 194 that distributes the premixture of gaseous, homogenous diesel fuel and oxidizer to several combustion chambers, such as the diesel engine 10 cylinders 14 (FIG. 1). Further, some embodiments include an intake pillar, such as a conical pillar 196, at the second outlet nozzle 186. The conical pillar 196 may be part of the intake manifold 194. However, according to some embodiments the conical pillar 196 may also be part of and attached to the pre-combustion diesel fuel mixing device 100.

According to one embodiment, the conical pillar 196 is coaxial with the first axis 109. The conical pillar 196 may be made of metal, plastic, ceramic, composite, or other materials. The conical pillar 196 may tend to center or hold the vortexes formed in either the first or second pre-combustion vortex chambers 108, 158. Centering or holding the vortexes formed in either the first or second pre-combustion vortex chambers 108, 158 may aid in the pulverizing and mixing of the fuel into the premixture of gaseous, homogenous fuel and oxidizer. Centering the vortexes with the conical pillar 196 also tends to evenly distribute the premixture of gaseous, homogenous fuel and oxidizer into each of the various intake passageways of the intake manifold 194 leading to combustion chambers, such as the first passageway 26 leading to the cylinder 14 as shown in FIGS. 1-2.

The conical pillar 196 may take on many forms. According to one embodiment, the conical pillar 196 comprises at least two different slopes. For example, a first conic surface 198 may have a first slope, and a second conic surface 200 may have a second slope steeper than the first slope. However, the conical pillar 196 may have a single slope according to one embodiment, and the second conic surface 200 may be replaced by a cylindrical surface according to some embodiments. As shown in the embodiments of FIGS. 1-7, the conical pillar 196 may comprise a peripheral lip 202 between the first and second conic surfaces 198, 200. The peripheral lip 202 may provide a collection area for any liquids that fall out of the premixture of gaseous, homogenous diesel fuel and oxidizer created by the vortexes. As the flow of gaseous, homogenous diesel fuel and oxidizer passes by the conical pillar 196, it tends to "drag" with it some of the liquids that collect at the peripheral lip 202.

According to one embodiment, the housing 102 may define a heat exchanger such as a water cooling jacket 103. The water cooling jacket 103 is in fluid communication with the cooling system of the diesel engine and arranged around the first pre-combustion vortex chamber 108. The water cooling jacket 103 comprises an internal fluid passageway of the housing 102 and may heat oxidant flowing through the first oxidant flow introduction path 112. The water cooling jacket 103 primarily cools the engine and operates in steady state conditions at approximately 190-212° F.

According to some aspects, the pre-combustion diesel fuel mixing device 100 facilitates methods of mixing diesel fuel with oxidant. For example, some aspects provide methods of fueling a diesel engine. According to one aspect, diesel fuel is mixed with an oxidant by axially introducing fuel into an oxidant vortex. For example, diesel fuel may be axially introduced into either or both of the first and second pre-combustion vortex chambers 108, 158 via the fuel injector 126. In some cases, engine action creates a vacuum to draw air or other oxidant into one or both of the first and second pre-combustion vortex chambers 108, 158. In other cases, such as when a turbocharger is used, engine action creates positive pressure to push air or other oxidant into one or both of the first and second pre-combustion vortex chambers 108, 158. The arrangement of the angled passages 110, 160 into each of the first and second pre-combustion vortex chambers 108, 158 creates a vortex when air is drawn or pushed therein. Moreover, according to one embodiment, vortexes created in either of the first and second pre-combustion vortex chambers 108, 158 are held and centered by naturally attaching to the conical pillar 196.

According to one embodiment, diesel fuel is introduced axially (as opposed to tangentially or radially or laterally through circumferential slots such as the angled passages 110, 160) into the first and second pre-combustion vortex chambers 108, 158 to pulverize or atomize the fuel and create a gaseous, homogenous premixture of diesel fuel and oxidizer. According to one embodiment, the pulverizing action is in an axial area spaced from the outer walls (at the angled passages 110, 160).

According to some embodiments, the gaseous, homogenous premixture of diesel fuel and oxidizer is drawn from the first and/or second vortex chambers 108, 158 into a combustion chamber such as the cylinder 14. According to one embodiment, neither the fuel nor oxidant is injected or injected under pressure into the cylinder 14. Instead, according to one embodiment, the premixture of fuel and oxidant is drawn into the cylinder 14 by vacuum (created, for example, by the reciprocation of the piston 16 in the cylinder 14). Therefore, shockwaves that accompany typical diesel fuel injection systems may be prevented in the cylinder 14. Further, the premixture of diesel fuel and oxidant drawn into the cylinder 14 by vacuum may be more likely to evenly distribute within the cylinder 14 to fill the vacuum. Nevertheless, according to one embodiment, the premixture of diesel fuel and oxidant may be pressurized and injected into the cylinder 14, especially by a turbocharger or supercharger. However, even positive pressure embodiments omitting a fuel injector at the cylinder 14 continue to minimize the occurrence of shockwaves in the cylinder 14.

According to some embodiments, the first vortex chamber 108 operates either alone or in combination with the second-vortex chamber 158. For example, the butterfly valve 166 disposed in the second oxidant flow path 162 may be normally closed (but may allow a small amount of oxidant to leach thereby and enter, for example, the angled passages 152 of the first outlet nozzle 142). The valve 116 and the fuel injector 126 may be operated in electronic or mechanical coordination to provide a combustible ratio of fuel and oxidant based on need and/or engine speed. According to one embodiment, the first vortex chamber 108 comprises a high vacuum, low flow rate vortex chamber, and therefore the valve 116 is normally open when an engine needs a low flow rate of gaseous, homogenous diesel fuel and oxidizer. The first vortex chamber 108 may also comprise a positive pressure, low flow rate vortex chamber as most diesel engines include a turbocharger or a supercharger. The valve 116 may be infinitely adjustable to provide an appropriate amount of oxidant for introduced fuel.

According to one embodiment, when combustion needs require a higher flow rate of gaseous, homogenous premixture of diesel fuel and oxidizer than the first oxidant flow path 112 can reasonably provide, the butterfly valve 166 may also open. For example, in one embodiment, the first oxidant flow path 112 can provide air mass flow rates ranging between approximately 0 and 262 lbm/hr. The second oxidant flow path 162 can provide higher flow rates of oxidant into the second pre-combustion vortex chamber 158 than the first oxidant flow path 112 can provide to the first pre-combustion vortex chamber 108. Therefore, the second pre-combustion vortex chamber 158 may comprise a low vacuum, high flow rate vortex chamber. The second pre-combustion vortex chamber 158 may also comprise a positive pressure, high flow rate vortex chamber as a result of turbocharging or supercharging. In one embodiment, the second oxidant flow path 162 can provide air mass flow rates ranging between approximately 0 and 1400 lbm/hr. In other embodiments, the second oxidant flow path 162 can provide air mass flow rates greater than 1400 lbm/hr. A "low" flow rate refers to a mass flow rate of less than approximately 262 lbm/hr. A "high" flow rate refers to a mass flow rate of more than approximately 262 lbm/hr. The butterfly valve 166 may also be infinitely adjustable to provide an appropriate amount of oxidant for introduced fuel. In one embodiment, the butterfly valve 166 is only opened after the valve 116 is fully open. Because the first and second pre-combustion vortex chambers 108, 158 are aligned axially in some embodiments, the same fuel injector 126 may provide fuel to both chambers. It will be understood by one of ordinary skill in the art having the benefit of this disclosure, however, that the ranges of flow rates mentioned above are exemplary in nature and the flow paths 112, 162 may be altered to provide other flow ranges as well.

According to one embodiment, flow through the first and second oxidant flow paths 112, 162 is additive. That is to say, when the valve 116 is fully open and additional flow capacity is necessary, the butterfly valve 166 is opened as well. For example, in one embodiment, the valve 116 may adjust flow rate between approximately 0 and 262 lbm/hr, and the butterfly valve 166 may be opened to increase flow rate capacity from 262 lbm/hr to 1400 lbm/hr or more. According to one embodiment, the butterfly valve 166 is mechanically connected to the gas pedal 170 of an automobile such that when the gas pedal is depressed to a predetermined level or a predetermined oxidizer requirement threshold is met, the valve 116 is fully open and the butterfly valve 166 opens. Nevertheless, according to one embodiment, the valve 116 and the butterfly valve 166 may each be only partially open.

According to one aspect, the pre-combustion diesel fuel mixing device 100 is in operation with the valve 116 in the first oxidant flow introduction path or source 112 open. Oxidant enters the first pre-combustion vortex chamber 108 and creates a vortex. Diesel fuel is introduced into the center of the vortex of the first pre-combustion vortex chamber 108, which pulverizes the fuel and creates the gaseous, homogenous premixture of diesel fuel and oxidizer. The gaseous, homogenous premixture of diesel fuel and oxidizer passes through the first outlet nozzle 142, through the second pre-combustion vortex chamber 108, and out the second outlet nozzle 186. According to some embodiments, which may include the conical pillar 196, the flow of gaseous, homogenous premixture of diesel fuel and oxidizer is evenly distributed though the intake manifold 194 and drawn under vacuum or introduced at positive pressure into one or more cylinders 14 or other combustion chambers.

According to one aspect, the pre-combustion diesel fuel mixing device 100 is in operation with the butterfly valve 166 in the second oxidant flow introduction path or source 162 open. Oxidant enters the second pre-combustion vortex chamber 158 and creates a vortex. Diesel fuel is introduced into the center of the vortex of the second pre-combustion vortex chamber 158, which pulverizes the fuel and creates the gaseous, homogenous premixture of diesel fuel and oxidizer. The gaseous, homogenous premixture of diesel fuel and oxidizer passes through the second outlet nozzle 186 and is evenly distributed though the intake manifold 194 and drawn under vacuum pressure or injected under positive pressure into one or more combustion chambers such as cylinder 14.

According to one aspect, the pre-combustion diesel fuel mixing device 100 operates to fuel an automobile and varies an air-to-fuel ratio. For example, in one embodiment, the valves 116, 166 operate automatically (either electronically programmed or a mechanical control) to vary air-to-fuel ratio based on engine speed and the load on the engine. In one embodiment, intake manifold absolute pressure is monitored, which is representative of the load on the engine.

In one embodiment, the automatic variation of the air-to-fuel ratio may follow parameters of a lookup table, a formula, or other feature. Under some conditions, it is believed that a stoichiometric air-to-fuel ratio is ideal. However, some engine conditions may result in better fuel efficiency, more power, or other desired performance characteristics, at non-stoichiometric air-to-fuel ratios. The stoichiometric air-to-fuel ratio for diesel is approximately 14.3 to 14.5:1. That is to say, a stoichiometric mixture of diesel and air comprises 14.3 to 14.5 parts air for every one part diesel, depending on the composition of the diesel fuel. Nevertheless, according to some embodiments, the pre-combustion diesel fuel mixing device 100 is operated to vary the air-to-fuel ratio. Generally, according to some aspects, at reduced loads, which may include idle or highway cruising conditions, the air-to-fuel ratio tends to be increased, in some conditions to ratios well above stoichiometric. At higher loads, on the other hand, the air-to-fuel ratio may be decreased, sometimes below stoichiometric.

The preceding description has been presented only to illustrate and describe certain aspects, embodiments, and examples of the principles claimed below. It is not intended to be exhaustive or to limit the described principles to any precise form disclosed. Many modifications and variations are possible in light of the above teaching. Such modifications are contemplated by the inventor and within the scope of the claims. The scope of the principles described is defined by the following claims. It will be understood that the figures and accompanying text are exemplary in nature, and not limiting. For example, a pre-combustion diesel fuel mixing device can be used in cooperation with any diesel engine, and is not limited to use with the engine 10 shown in FIGS. 1-2.

What is claimed is:

1. A method of providing fuel to a diesel engine, comprising:
    fueling a diesel engine, the fueling comprising:
        creating a gaseous, homogenous premixture of diesel fuel and oxidizer in a first pre-combustion vortex chamber, the first pre-combustion vortex chamber having a generally cylindrical shape with a periphery and a central axis, wherein creating the gaseous, homogenous premixture includes supplying the oxidizer along the periphery and supplying the diesel fuel along the central axis into the oxidizer;
        introducing the gaseous, homogenous premixture of diesel fuel and oxidizer from the first pre-combustion vortex chamber into a combustion chamber.

2. A method of providing fuel to a diesel engine according to claim 1, further comprising minimizing shockwaves in the combustion chamber.

3. A method of providing fuel to a diesel engine according to claim 1, further comprising preventing shockwaves in the combustion chamber.

4. A method of providing fuel to a diesel engine according to claim 1, further comprising igniting the gaseous, homogenous premixture of diesel fuel and oxidizer in the ignition chamber with an ignition source.

5. A method of providing fuel to a diesel engine according to claim 1 wherein the creating a gaseous, homogenous premixture of diesel fuel and oxidizer comprises:
    creating an oxidizer vortex about the central axis in the first pre-combustion vortex chamber;
    pulverizing the diesel fuel and mixing the diesel fuel with the oxidizer at an axial area of the first pre-combustion vortex chamber.

6. A method of providing fuel to a diesel engine according to claim 1 wherein the creating a gaseous, homogenous premixture of diesel fuel and oxidizer comprises:
    creating an oxidizer vortex about the central axis in the first pre-combustion vortex chamber;
    pulverizing the diesel fuel and mixing the diesel fuel with the oxidizer;
    wherein the creating an oxidizer vortex comprises introducing the oxidizer into the first pre-combustion vortex chamber at a non-tangential, non-radial angle through multiple fluid passageways along the periphery of the first pre-combustion vortex chamber.

7. A method of providing fuel to a diesel engine according to claim 1 wherein the creating a gaseous, homogenous premixture of diesel fuel and oxidizer comprises:
    providing a primary stage oxidizer introduction path;
    providing a secondary stage oxidizer introduction path;

opening a valve in the secondary stage oxidizer introduction path upon reaching a predetermined oxidizer requirement threshold;

creating an oxidizer vortex in a second pre-combustion vortex chamber with fluid flow from the secondary stage oxidizer introduction path;

introducing diesel fuel at an axis of the oxidizer vortex;

pulverizing the diesel fuel and mixing the diesel fuel with the oxidizer.

8. A method of providing fuel to a diesel engine according to claim 1 wherein the creating a gaseous, homogenous premixture of diesel fuel and oxidizer comprises:

providing a primary stage oxidizer introduction path;

providing a secondary stage oxidizer introduction path;

opening a valve in the secondary stage oxidizer introduction path upon reaching a predetermined oxidizer requirement threshold and holding open a valve in the primary stage oxidizer introduction path;

creating an oxidizer vortex in a second pre-combustion vortex chamber with fluid flow from the secondary stage oxidizer introduction path;

introducing diesel fuel at an axis of the oxidizer vortex;

pulverizing the diesel fuel and mixing the diesel fuel with the oxidizer.

9. A method of providing fuel to a diesel engine according to claim 1, further comprising varying an air-to-fuel ratio of the gaseous, homogenous premixture of diesel fuel based on engine speed and engine load.

10. A method of running an engine, comprising:

operating a diesel engine, the operating comprising:

creating a gaseous, homogenous premixture of diesel fuel and oxidizer in a first pre-combustion vortex chamber, the first pre-combustion vortex chamber having a generally cylindrical shape with a periphery and central axis, wherein creating the gaseous, homogenous premixture includes supplying the oxidant along the periphery to create an oxidant vortex and supplying the diesel fuel along the central axis into the oxidant vortex;

flowing the gaseous, homogenous premixture of diesel fuel and oxidizer into a combustion cylinder of the diesel engine;

compressing the gaseous, homogenous premixture of diesel fuel and oxidizer in the combustion cylinder with a piston at a ratio of at least about 15:1 without causing auto-ignition of the gaseous, homogenous premixture of diesel fuel and oxidizer;

igniting the compressed gaseous, homogenous premixture of diesel fuel and oxidizer with a spark generating member.

11. A method of running an engine according to claim 10 wherein the igniting comprises creating a spark with a spark plug in the cylinder.

12. A method of running an engine according to claim 10, further comprising compressing the gaseous, homogenous premixture of diesel fuel and oxidizer in the cylinder with a piston at a ratio of greater than 21:1 without causing auto-ignition of the gaseous, homogenous premixture of diesel fuel and oxidizer.

13. A method of running an engine according to claim 10, further comprising compressing the gaseous, homogenous premixture of diesel fuel and oxidizer in the cylinder with a piston at a ratio of at least 25:1 without causing auto-ignition of the gaseous, homogenous premixture of diesel fuel and oxidizer.

14. A method of running an engine according to claim 10 wherein the creating a gaseous, homogenous premixture of diesel fuel and oxidizer comprises maintaining a combustible mixture while reducing the diesel fuel to an average particle size such that compressing the gaseous, homogenous premixture of diesel fuel and oxidizer in the cylinder with a piston at a ratio of at least 25:1 does not cause auto- ignition of the gaseous, homogenous premixture of diesel fuel and oxidizer.

15. A method of running an engine according to claim 10, further comprising compressing the gaseous, homogenous premixture of diesel fuel and oxidizer in the cylinder with a piston at a ratio of at least 30:1 without causing auto-ignition of the gaseous, homogenous premixture of diesel fuel and oxidizer.

16. A method of running an engine according to claim 10, further comprising compressing the gaseous, homogenous premixture of diesel fuel and oxidizer in the cylinder with a piston at a ratio of at least 40:1 without causing auto-ignition of the gaseous, homogenous premixture of diesel fuel and oxidizer.

17. A method of running an engine according to claim 10, further comprising varying an air-to-fuel ratio of the gaseous, homogenous premixture of diesel fuel based on engine speed and engine load.

18. A method of providing fuel to a diesel engine, comprising:

fueling a diesel automobile, the method further comprising:

premixing diesel fuel with an oxidant in a pre-combustion vortex chamber, the pre-combustion vortex chamber having a generally cylindrical shape with a periphery and a central axis, the premixing comprising supplying the oxidant to the pre-combustion vortex chamber through a plurality of openings along the periphery to create a oxidant vortex, and introducing diesel fuel into the oxidant vortex along the central axis to create a premixed diesel fuel and oxidant mixture;

inputting the premixed diesel fuel and oxidant mixture into a combustion chamber of the automobile without forcing additional diesel fuel into the combustion chamber.

19. A method of providing fuel to a diesel engine according to claim 18 wherein the premixing comprises:

providing first and second vortex chambers in series, wherein the first vortex chamber only or both the first and second vortex chambers receive a supply of oxidant, wherein the oxidant enters the first and second vortex chambers at an angle and creates the oxidant vortex;

providing a fuel injector and injecting diesel fuel axially along the central axis into the oxidant vortex created by either one of the first or second vortex chambers.

20. A method of providing fuel to a diesel engine according to claim 18 wherein the premixing comprises centering the oxidant vortex about the central axis and holding the oxidant vortex.

21. A method of providing fuel to a diesel engine according to claim 18 further comprising evenly distributing the premixed diesel fuel and oxidant into a manifold prior to inputting the premixed diesel fuel and oxidant mixture into the combustion chamber.

22. A method of providing fuel to a diesel engine, comprising:

fueling a diesel engine, the fueling comprising:

creating a gaseous, homogenous premixture of diesel fuel and oxidizer in a first pre-combustion vortex chamber, wherein creating the gaseous, homogenous premixture of diesel fuel and oxidizer comprises:

providing a primary stage oxidizer introduction path;

providing a secondary stage oxidizer introduction path;

opening a valve in the secondary stage oxidizer introduction path upon reaching a predetermined oxidizer requirement threshold;

creating an oxidizer vortex in a second pre-combustion vortex chamber with fluid flow from the secondary stage oxidizer introduction path;

introducing diesel fuel at an axis of the oxidizer vortex;

pulverizing the diesel fuel and mixing the diesel fuel with the oxidizer;

introducing the gaseous, homogenous premixture of diesel fuel and oxidizer from the first pre-combustion vortex chamber into a combustion chamber.

23. A method of providing fuel to a diesel engine, comprising:

fueling a diesel engine, the fueling comprising:

creating a gaseous, homogenous premixture of diesel fuel and oxidizer in a first pre-combustion vortex chamber, wherein creating the gaseous, homogenous premixture of diesel fuel and oxidizer comprises:

providing a primary stage oxidizer introduction path;

providing a secondary stage oxidizer introduction path;

opening a valve in the secondary stage oxidizer introduction path upon reaching a predetermined oxidizer requirement threshold and holding open a valve in the primary stage oxidizer introduction path;

creating an oxidizer vortex in a second pre-combustion vortex chamber with fluid flow from the secondary stage oxidizer introduction path;

introducing diesel fuel at an axis of the oxidizer vortex;

pulverizing the diesel fuel and mixing the diesel fuel with the oxidizer;

introducing the gaseous, homogenous premixture of diesel fuel and oxidizer from the first pre-combustion vortex chamber into a combustion chamber.

24. A method of running an engine, comprising:

operating a diesel engine, the operating comprising:

creating a gaseous, homogenous premixture of diesel fuel and oxidizer in a first pre-combustion vortex chamber;

flowing the gaseous, homogenous premixture of diesel fuel and oxidizer into a cylinder of the diesel engine;

compressing the gaseous, homogenous premixture of diesel fuel and oxidizer in the cylinder with a piston at a ratio of greater than 21:1 without causing auto-ignition of the gaseous, homogenous premixture of diesel fuel and oxidizer;

igniting the gaseous, homogenous premixture of diesel fuel and oxidizer.

25. A method of running an engine, comprising:

operating a diesel engine, the operating comprising:

creating a gaseous, homogenous premixture of diesel fuel and oxidizer in a first pre-combustion vortex chamber, wherein creating the gaseous, homogenous premixture of diesel fuel and oxidizer comprises maintaining a combustible mixture while reducing the diesel fuel to an average particle size such that compressing the gaseous, homogenous premixture of diesel fuel and oxidizer in the cylinder with a piston at a ratio of at least 25:1 does not cause auto-ignition of the gaseous, homogenous premixture of diesel fuel and oxidizer;

flowing the gaseous, homogenous premixture of diesel fuel and oxidizer into a cylinder of the diesel engine;

compressing the gaseous, homogenous premixture of diesel fuel and oxidizer in the cylinder with a piston at a ratio of at least about 15:1 without causing auto-ignition of the gaseous, homogenous premixture of diesel fuel and oxidizer;

igniting the gaseous, homogenous premixture of diesel fuel and oxidizer.

\* \* \* \* \*